(12) United States Patent
Sesha et al.

(10) Patent No.: US 11,582,122 B2
(45) Date of Patent: Feb. 14, 2023

(54) SYSTEM AND METHOD FOR PERFORMING PROGRAMMABLE ANALYTICS ON NETWORK DATA

(71) Applicant: Hewlett Packard Enterprise Development LP, Houston, TX (US)

(72) Inventors: Madhusoodhana Chari Sesha, Karnataka (IN); Ankit Kumar Sinha, Karnataka (IN); Krishna Mohan Elluru, Karnataka (IN); M Arun Kumar, Karnataka (IN); A Abdul Samadh, Karnataka (IN); Jayachandra Babu K, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/406,837

(22) Filed: Aug. 19, 2021

(65) Prior Publication Data
US 2022/0158918 A1     May 19, 2022

(30) Foreign Application Priority Data
Nov. 13, 2020   (IN) .................. IN 202041049750

(51) Int. Cl.
| | | |
|---|---|---|
| G06F 15/173 | (2006.01) | |
| H04L 43/08 | (2022.01) | |
| H04L 69/22 | (2022.01) | |
| H04L 43/062 | (2022.01) | |

(52) U.S. Cl.
CPC ............ *H04L 43/08* (2013.01); *H04L 43/062* (2013.01); *H04L 69/22* (2013.01)

(58) Field of Classification Search
None
See application file for complete search history.

(56) References Cited

U.S. PATENT DOCUMENTS

2007/0271374 A1* 11/2007 Shomura ............... H04L 43/026
                                                                    709/224
2021/0168083 A1*  6/2021 Somu .................. H04L 47/2441

OTHER PUBLICATIONS

"Aruba Network Switch Software," https://www.arubanetworks.com/products/networking/switches/software/, Mar. 9, 2022, pp. 5.

(Continued)

*Primary Examiner* — Anh Nguyen
(74) *Attorney, Agent, or Firm* — Hewlett Packard Enterprise Patent Department

(57) ABSTRACT

A system and a method for performing programmable analytics on network data are described. A data layer constructs flow behavior information based on information present within headers of data packets flowing across one or more network devices configured in a computer network. An inline heuristics layer performs one or more inline heuristic operations on the flow behavior information to obtain aggregate statistical information. An integrated analytics layer performs one or more analytical operations on the flow behavior information to obtain network insights. A presentation layer filters and plots information obtained from the data layer, the inline heuristics layer, and the integrated analytics layer, based on a user input.

20 Claims, 6 Drawing Sheets

(56) References Cited

OTHER PUBLICATIONS

Arista, "Leveraging EOS and sFlow for Advanced Network Visibility," https://solutions.arista.com/hubfs/Arista/White_Papers/Leveraging_EOS_sFlow_Whitepaper.pdf, Oct. 11, 2020, pp. 1-9.

Cisar, P., et al., "A Flow-based Algorithm for Statistical Anomaly Detection," 7th International Symposium of Hungarian Researchers on Computational Intelligence, 2006, pp. 423-432.

* cited by examiner

Time

SYSTEM AND METHOD FOR PERFORMING PROGRAMMABLE ANALYTICS ON NETWORK DATA

BACKGROUND

A computer network is established by connecting several network devices. These network devices include network switch, router, bridge, repeater, and hub. Each of these network devices is programmed to receive data from a source device and forward data with another network device present along a network path, to provide the data to an intended receiver. In packet switched networks, the data is forwarded in form of data packets, which may travel through the network devices present in the computer network. Performance of the network devices change over time, and thus certain configuration changes are required to be made in them.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles related to the present disclosure. The embodiments are illustrated by way of example and not by way of limitation in the figures of the accompanying drawings in which like references indicate similar elements, it should be noted that references to "an" or "one" embodiment in this disclosure are not necessarily to the same embodiment, and they mean at least one. In the drawings.

DETAILED DESCRIPTION

Post configuration of network devices in a computer network, performance of one or more of the network devices may deteriorate. Such deterioration in performance may be caused due to several factors including, but not limited to, significant increase in data traffic, change in type of data flow, occurrence of certain network events, implementation of improper routing schemes, jitter, and inadequate processing capabilities of the network devices.

In order to keep-up performance of the network devices, present disclosure provides complete visibility of operations performed by the network devices. Specifically, several programmable analytics operations are performed on data collected from the network devices to obtain network insights which could be used for management of network experience and network planning.

In one embodiment, a data layer is provided to construct flow behavior information based on information present within headers of data packets flowing across network devices configured in the computer network. An inline heuristics layer is provided for performing inline heuristic operations on the flow behavior information to obtain aggregate statistical information. An integrated analytics layer is provided to perform analytical operations on the flow behavior information to obtain network insights. A presentation layer is provided to filter and plot information obtained from the data layer, the inline heuristics layer, and the integrated analytics layer, based on a user input. The presentation layer may provide information indicating performance of the network devices. Using such information, a user (generally a network administrator) can make required modifications in configurations of the network devices, to obtain a desired performance of the computer network.

The detailed description set forth below in connection with the appended drawings is intended as a description of various embodiments of the present disclosure and is not intended to represent the only embodiments in which details of the present disclosure may be implemented. Each embodiment described in this disclosure is provided merely as an example or illustration, and should not necessarily be construed as preferred or advantageous over other embodiments.

Figure 1:
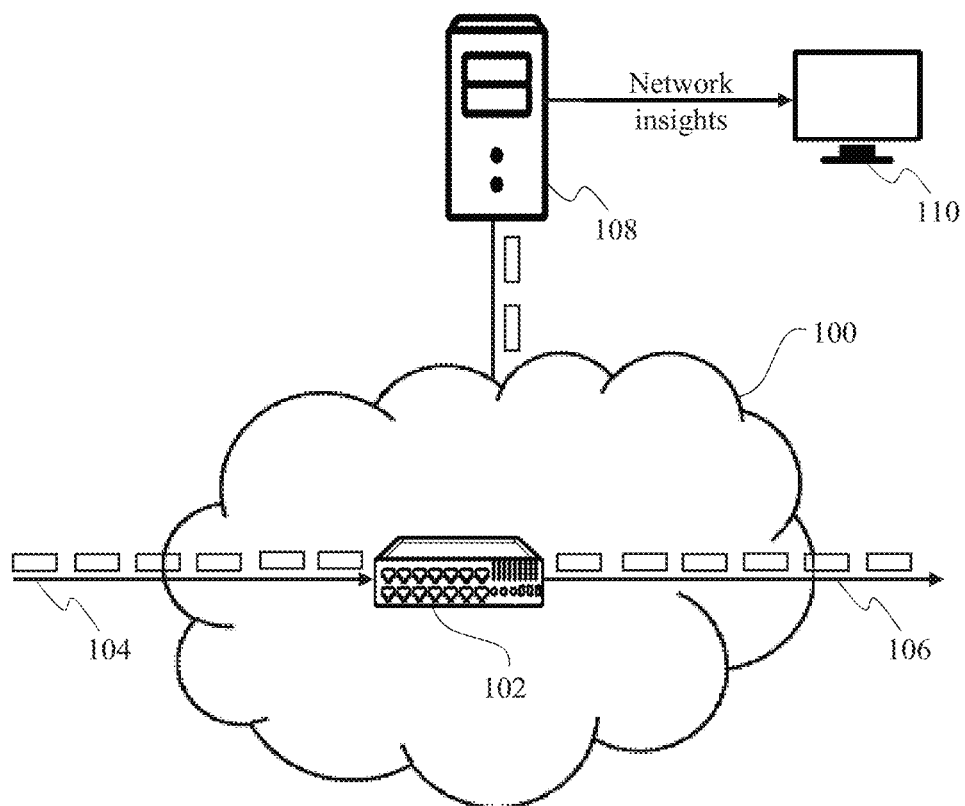
FIG. 1 illustrates connection diagram of a network device configured in a computer network, in accordance with an embodiment of the present disclosure.

FIG. 1 illustrates connection diagram of a network device configured in a computer network 100, in accordance with an embodiment of the present disclosure. Although several network devices would be configured within the computer network 100, only a network switch 102 is illustrated for the ease of illustration and explanation. The network switch 102 receives an incoming data stream 104 and delivers an outgoing data stream 106. The incoming data stream 104 may include data packets when the computer network 100 is a packet switched data network. The data packets may be encrypted or unencrypted.

A processing device, such as a server 108, may be connected with the computer network 100 to receive a copy of the data packets of the incoming data stream 104 received by the network switch 102. The server 108 may be configured to perform programmable analytics on information present in headers of the data packets of the incoming data stream 104. Upon performing the programmable analytics, the analytical information may be presented on a display device, such as a monitor 110, for providing real time insights related to one or more network devices, such as the network switch 102 in current implementation.

Figure 2:
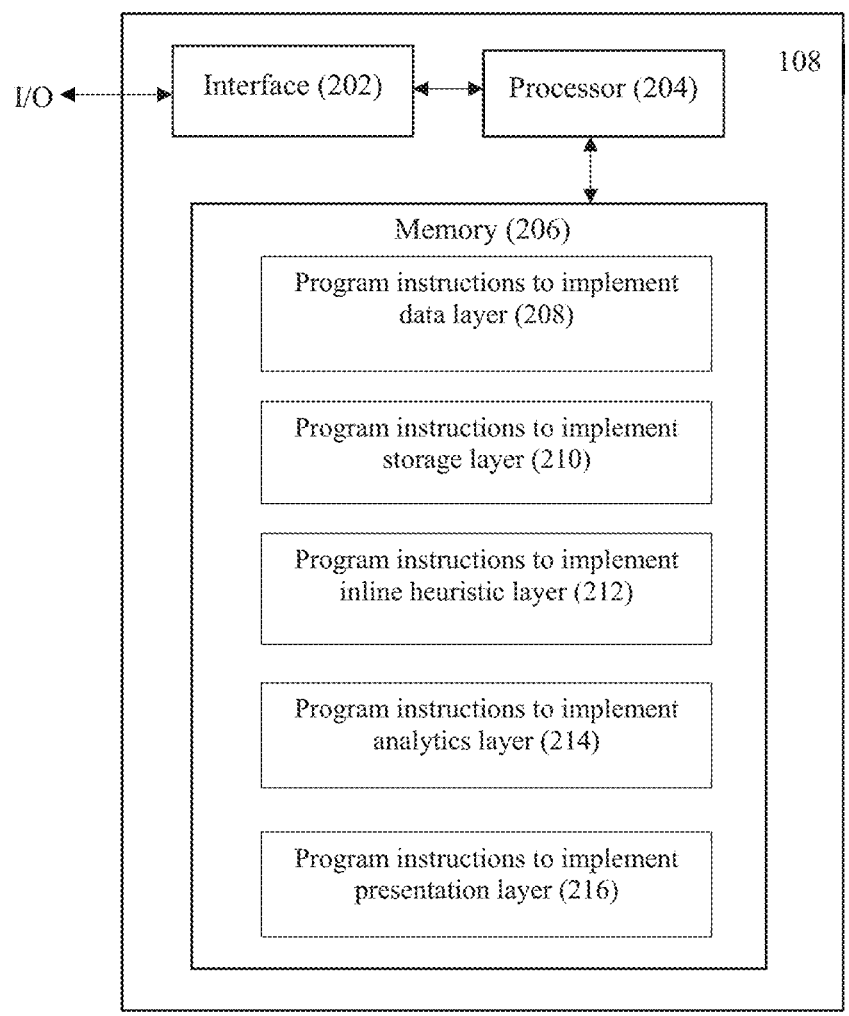
FIG. 2 illustrates a block diagram showing different components of server for performing programmable analytics on network data, in accordance with an embodiment of the present disclosure.

FIG. 2 illustrates a block diagram showing different components of the server 108 used to perform programmable analytics on network data, in accordance with an embodiment of the present disclosure. The server 108 may comprise an interface 202, a processor 204, and a memory 206. The memory 206 may store program instructions to execute several functions, which contributes to the programmable analytics, on the network data. Specifically, the memory 206 may comprise program instructions for implementing different layers to collect, store, and process the network data. A few such program instructions stored in the memory 206 includes program instructions to implement data layer 208, program instructions to implement storage layer 210, program instructions to implement inline heuristic layer 212, program instructions to implement analytics layer 214, and program instructions to implement presentation layer 216. Functioning of each layer is explained in detail henceforth.

Headers of data packets received by any network device contains multiple information including, but not limited to, source Internet Protocol (IP) address, source port address, source Media Access Control (MAC) address, destination IP address, destination port address, and destination MAC address. Different statistical operations could be performed upon the information gathered from the headers of the data packets. The statistical operations may be performed to provide secure visibility in form of uniqueness, frequency of occurrence, and flags such as Urgent (URG), Acknowledgement (ACK), Push (PSH), Reset (RST), Synchronize (SYN), and Finish (FIN). In some implementations, the statistical operations may be performed to provide utility visibility in form of volume of data packets, bit rate, and packet rate. In some implementations, the statistical operations may include classification of the data packets as long lived, short lived, frequent, or infrequent, to provide behavior visibility. In some implementations, the statistical operations may be performed on packet length and inter packet arrival time to provide window visibility. In some implementations, the statistical operations may be performed to provide network visibility in form of prefix length match, route source, stability, and availability. In some implementations, the statistical operations may be performed to provide change detection in form of inter or all window variation counters, and moving average or window counters. For example, change detection may be performed for Inter Arrival time (IAT), number of bytes, and number of data packets.

Figure 3:
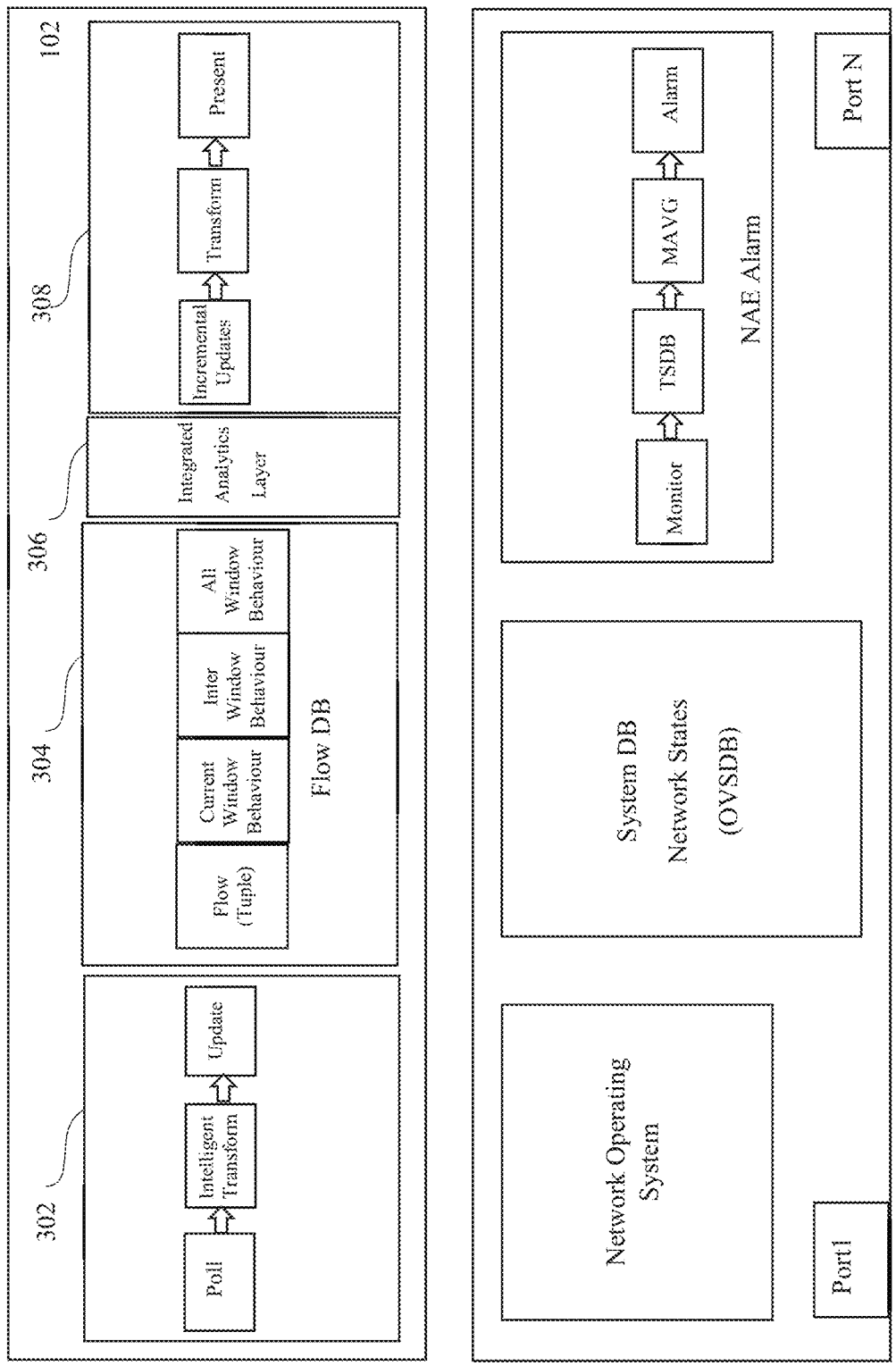
FIG. 3 illustrates a layered architecture implemented over a network device for performing programmable analytics on network data, in accordance with an embodiment of the present disclosure.

Current disclosure provides a framework for obtaining all the above mentioned information related to network data/traffic for performing programmable analytics. The network devices may include network routers, network switches, servers, desktops, laptops, and the like. Although the description is provided with reference to the network switch 102, it should be understood that it is fairly possible to implement the framework on other network devices. Further, it is also quite possible that the required information related to the data packets is collected and processed by the network device itself, for example by the network switch 102. The framework may be established through a software application that could be installed on the network switch 102. The framework comprises a layered architecture including the layers described below. FIG. 3 illustrates a layered architecture implemented over the network switch 102 for performing the programmable analytics on the network data. The details henceforth are provided with reference to the layered architecture illustrated in FIG. 3.

A data layer 302 may be provided to construct flow behavior information. In one case, a local flow based packet sampling may be used to construct the flow behavior information, based on information present within packet headers. The data layer 302 can work suitably on an encrypted data traffic. The flow behavior information is not limited to the information available at a network edge device, but can be furthered into any information which could be logically captured. All the information present within the packet headers is captured in form of window observation, for a predefined or configurable time period. During such time period, the information is captured into two broader aspects. The information is either captured as counts of parameters associated with the data packets, for example number of times a packet length changes, or captured as statistics of parameters associated with the data packets, such as mean and standard deviation of packet lengths seen.

The flow behavior information may be used for self-similarity change detection. In order to perform the self-similarity change detection, three windows may be constructed using the information captured from the packet headers. The three windows may include current window, inter window, and all window. The current window provides information on what flows are seen in that window time. The inter window provides information for the same flow across multiple windows. The all window provides information on flow behavior across all windows. Aggregate information, such as number of times for which length of the data packets' change, is used to generate statistical information. For example, the statistical information could include mean and standard deviation of a data packet's length changes across windows. Such information is useful in comparing the current window with the inter window, to determine a number of times for which a deviation is observed. Statistical features of the current window, such as mean packet length and standard deviation, becomes like Euclidian proximate statistics in the inter window. The Euclidian proximate statistics provide two dimensional insights into a Euclidian space within which the behavior across windows are seen.

Observation(s) derived from the current window, inter window, and all window i.e. window observations may be recorded in a storage layer. In one example, the window observation may be stored as comparison chart of mean packet lengths observed in the current window and the inter window. Such comparison chart can provide information about network experiences in the network switches and any frequency of deviation of any observation, which can be recorded in an integrated analytics layer 306.

The storage layer may be provided to store the flow behavior information produced and processed by the data layer 302. In one implementation, the flow behavior information may be stored in an independent flow table running in a separate instance of an Open vSwitch Database (OVSDB) management protocol within context of the software application installed on the network switch 102. Storing the flow behavior information in such manner i.e. out of the network switch 102 doesn't impact the network operations performed in the network switch 102. Further, such manner of storage of the flow behavior information allows deployment of described functionality as a downloadable software application not having any dependencies.

An inline heuristic layer 304 may be provided to perform inline heuristic operations on the flow behavior information. For example, an inline heuristic operation may be performed to determine average packet size across all flows. Because the scale of information required to be stored in the flow table is huge, the OVSDB management protocol is configured to perform the inline heuristic operations. By performing the inline heuristic operations to insert values within or to update the database, aggregate statistical information is captured per column, as OVSDB has a columnar architecture. In one implementation, the inline heuristic layer 304 can provide an average packet size across all flows that are stored in the database. The aggregate statistical information includes a summary of information across all flows and is very useful while several network switches are deployed, as a network cloud or a fog entity can query the aggregate statistical information in an effective manner. Further, the aggregate statistical information is very effective in integrating with an on switch Network Analytics Engine (NAE), for storing time series information of the network switch 102. Further, for the network switch 102, moving average anomalies can be determined. For example, windows average may be determined for last 10 windows of a feature after storing data of the last 10 windows of the feature in moving window buffers. Upon comparison of multiple such windows average values, the moving average anomalies could be determined. Based on identification of the moving average anomalies, alerts can be generated without needing to move or store the information to a time series database or a network cloud, merely for event tracking.

The integrated analytics layer 306 may be provided to perform one or more analytical operations on the flow behavior information. For example, "Routed By" function may be implemented at the integrated analytics layer 306 to compare flow destination prefix for longest prefix match in the switch database and to determine a distribution of amount of flows and quantity of network traffic carried by different routing entries. Such details would allow an administrator to make route configuration changes. Such details can include a statistical classifier for tagging flow windows based on packet lengths. Though approximate in nature, tagged visibility provides usefulness by showing variation in nature of window tagging and by capturing a majority of nature of flow. Therefore, such details may provide network insights which may be used to make changes in configuration of the network switch 102, such as making changes in a Quality of Service (QoS) and an IP address scheme.

A presentation layer 308 may be provided to perform an effective form of filtering of information obtained from the data layer, the inline heuristics layer, and the integrated analytics layer. To effectively convey an information as per requirements of an individual, flexibility is provided in plotting of the information using different chart types, such as distribution chart, line chart, and scatter chart. The presentation layer 308 may allow development of these charts for one or more factors including, but not limited to, flow (tuple), current window behavior, inter window heuristics, all window behavior, combined analytics prefix match, supervised tagging, and unsupervised cluster identity.

The presentation layer 308 may be configured to develop highly optimal charts which could be incrementally updated. The presentation layer 308 includes effective chiclets such that all charts are updated based on same information. Output of the presentation layer 308 could be accessed from a mobile application or through a network cloud. A detailed debug view similar to Microsoft Excel™ is also provided. Further, charts could be updated based on information present in the system database, such as an Access Control List (ACL) table, Route table. MAC table, or any other filter for specific prefixes. Using the effective form of filtering allowed by the presentation layer 308, deep network issues could be identified and addressed with ease.

Figure 4A:
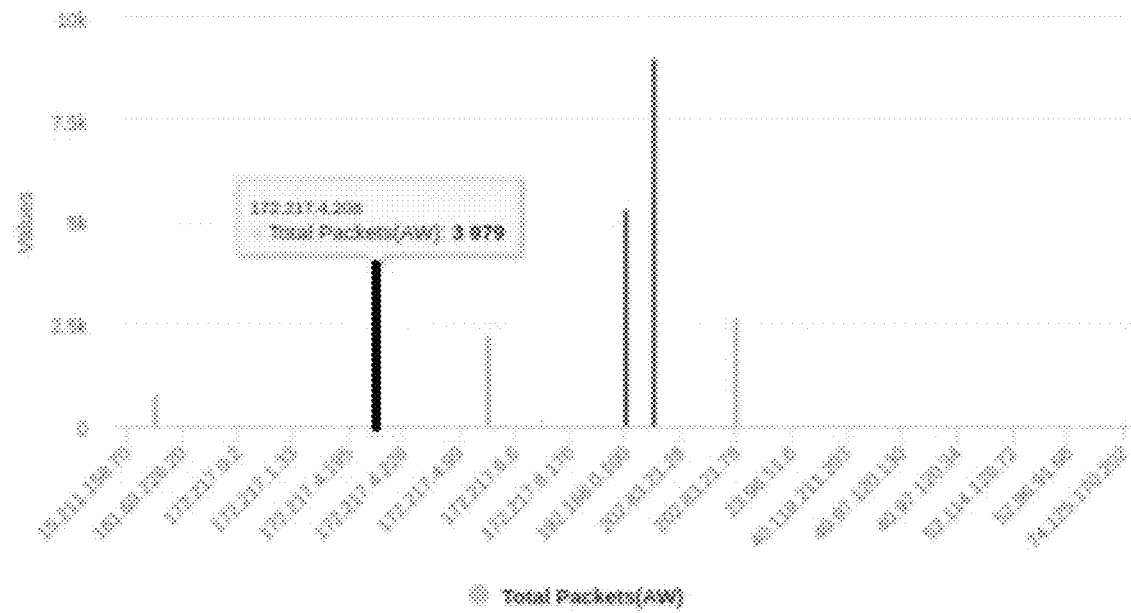
FIG. 4a illustrates a line graph plotted to represent source IP total data packets in all windows corresponding to different IP addresses, in accordance with an embodiment of the present disclosure.
Figure 4B:
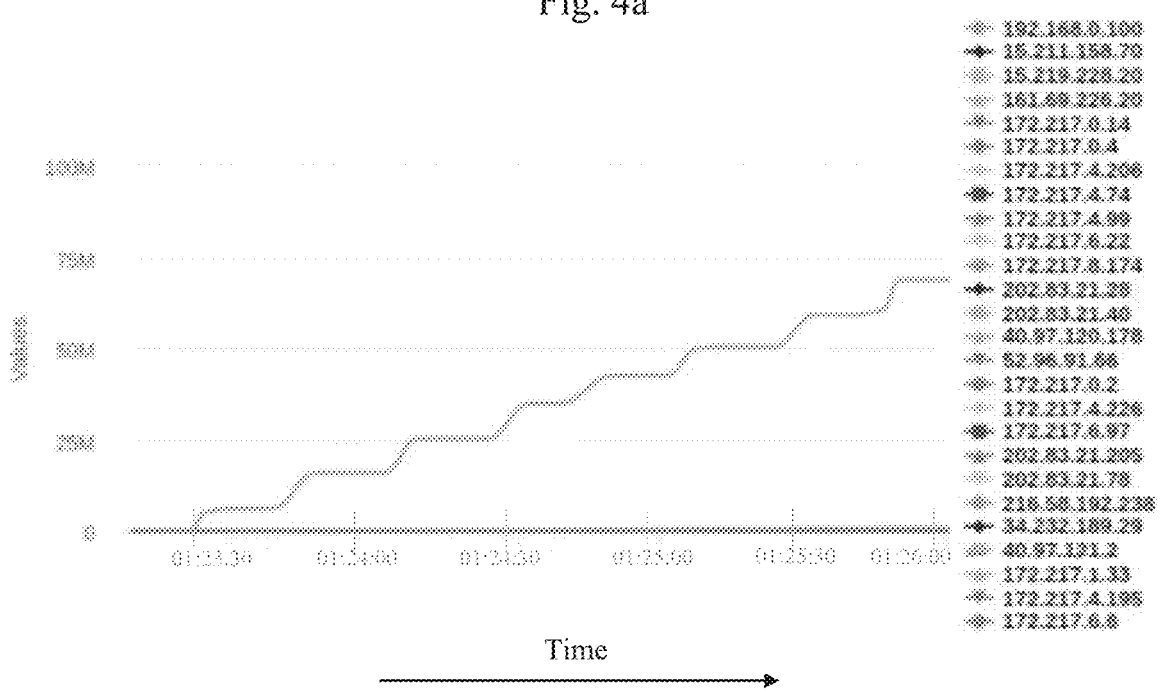
FIG. 4b illustrates destination IP volume of all windows for a time period for different IP addresses, in accordance with an embodiment of the present disclosure.
Figure 4C:
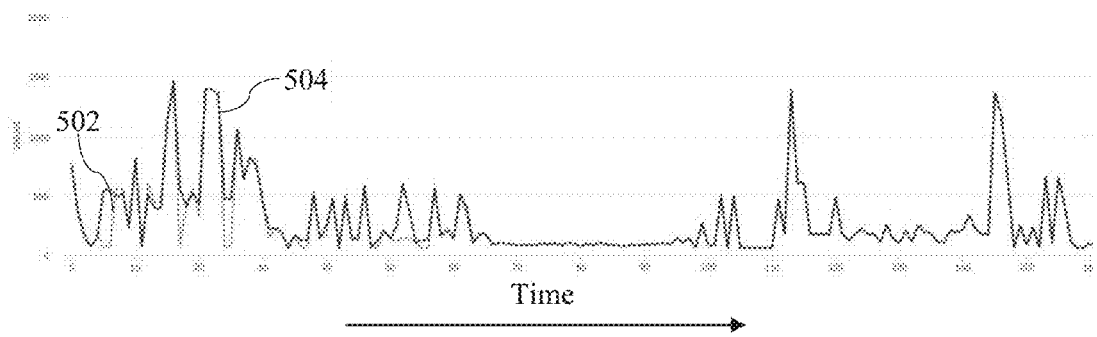
FIG. 4c illustrates a line chart showing mean packet lengths of a current window and an all window, observed over a time period, in accordance with an embodiment of the present disclosure.
Figure 4D:
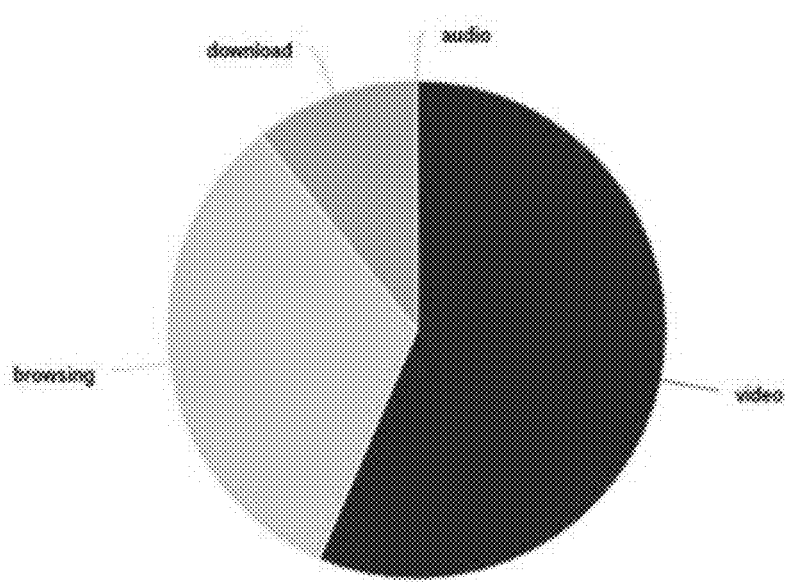
FIG. 4d illustrates a pie chart showing labels of data transferred over a computer network, in accordance with an embodiment of the present disclosure.

FIGS. 4a to 4d illustrate different develop highly optimal charts prepared by the presentation layer 308, FIG. 4a illustrates a line graph plotted to represent source IP total data packets in all windows corresponding to different IP addresses i.e. different devices. For example, corresponding to a selected IP address "172.217.4.206", the total data packets in all windows is shown to be 3,979. FIG. 4b illustrates destination IP volume of all windows for a time period for different IP addresses. With selection of an IP address amongst the list of IP addresses illustrated on the right side, the destination IP volume of all windows related to the selected IP address is illustrated. FIG. 4c illustrates a line chart showing mean packet lengths of a current window 502 and an all window 504, observed over a time period. FIG. 4d illustrates a pie chart showing labels of data transferred over a computer network. From FIG. 4d, it could be observed that a majority of data transferred over the computer network included video data, followed by browsing data, download data, and audio data.

Figure 5:
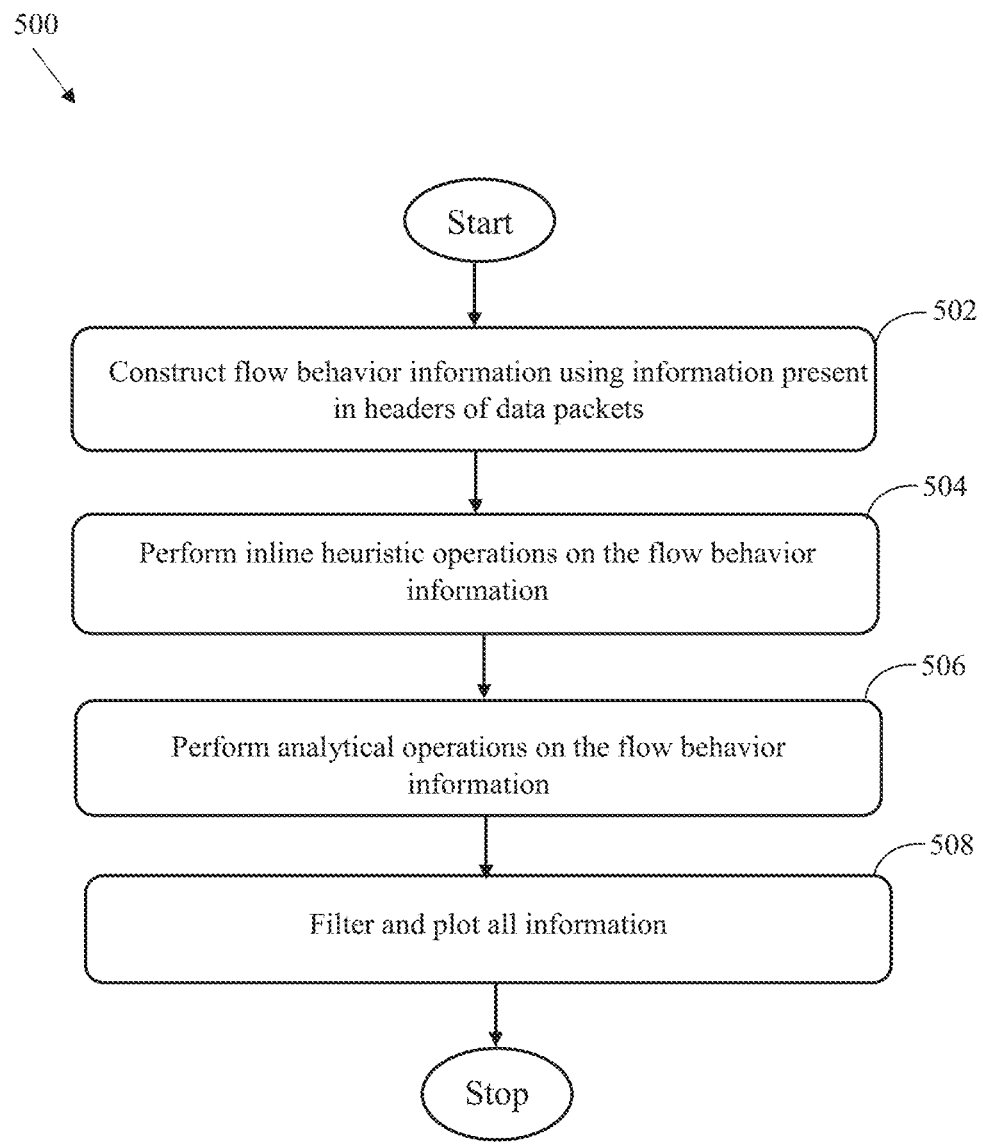
FIG. 5 illustrates a flowchart showing a method for performing programmable analytics on network data, in accordance with an embodiment of the present disclosure.

Referring now to FIG. 5, a method for performing programmable analytics on network data, is described with reference to the flowchart 500. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 5 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

At block 502, flow behavior information may be constructed, by a data layer, based on information present within data packet headers. In one aspect, a local flow based packet sampling may be used to construct the flow behavior information. The flow behavior information may be used for performing self-similarity change detection.

At block 504, inline heuristic operations may be performed, by an inline heuristic layer, on the flow based information to obtain aggregate statistical information. In one aspect, an Open vSwitch Database (OVSDB) management protocol is configured to perform the inline heuristic operations on huge size of flow behavior information stored in a flow table.

At block 506, one or more analytical operations may be performed, by an integrated analytics layer, on the flow behavior information to provide network insights. The network insights may be used to make changes required in configuration of a network device, such as to make changes in a Quality of Service (QoS) and an IP address scheme.

At block 508, an effective form of filtering may be performed, by a presentation layer, on information obtained from the data layer, the inline heuristics layer, and the integrated analytics layer. Output of the presentation layer may be used for identifying and addressing deep network issues, and may be accessed from a mobile application or through a network cloud.

An embodiment of the disclosure may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense.

An interface may be used to provide input or fetch output from the server. The interface may be implemented as a Command Line Interface (CLI), Graphical User Interface (GUI). Further. Application Programming Interfaces (APIs) may also be used for remotely interacting with the server.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, but is no limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

We claim:

1. A method comprising:
constructing, by a data layer, flow behavior information based on information present within headers of data packets flowing across one or more network devices configured in a computer network, wherein the flow behavior information is used for performing self-similarity change detection by constructing at least one of current window, inter window, and all window, wherein the current window provides information on flows observed in a window time, the inter window provides information for same flow across multiple windows, and the all window provides flow behavior across all windows;
performing, by an inline heuristics layer, one or more inline heuristic operations on the flow behavior information to obtain aggregate statistical information;
performing, by an integrated analytics layer, one or more analytical operations on the flow behavior information to obtain network insights; and
filtering and plotting, by a presentation layer, information obtained from the data layer, the inline heuristics layer, and the integrated analytics layer, based on a user input.

2. The method of claim 1, wherein the flow behavior information is constructed by flow based packet sampling of the information present within the headers of the data packet.

3. The method of claim 1, wherein the flow behavior information is captured as counts or statistics of one or more parameters associated with the data packets.

4. The method of claim 1, wherein the flow behavior information is captured in form of window observation, for a predefined time period.

5. The method of claim 1, wherein the flow behavior information is stored in an independent flow table running in a separate instance of Open vSwitch DataBase (OVSDB) management protocol.

6. The method of claim 1, wherein the one or more inline heuristic operations are performed using Open vSwitch DataBase (OVSDB) management protocol.

7. The method of claim 1, further comprising:
determining moving average anomalies by comparing data of a predefined number of past windows of a feature; and
generating local alerts indicating about the moving average anomalies.

8. The method of claim 1, wherein the aggregate statistical information is integrated with an on switch Network Analytics Engine (NAE) for storing time series information of a network switch.

9. The method of claim 1, wherein the network insights obtained from the integrated analytics layer are used for making changes in configuration of the one or more network devices.

10. The method of claim 1, wherein the presentation layer allows plotting of the information based on one or more factors including flow (tuple), current window behavior, inter window heuristic, all window behavior, combined analytics prefix match, supervised tagging, and unsupervised cluster identity.

11. A network device comprising:
a processor; and
a memory storing programmed instructions, which when executed by the processor, causes the processor to:
construct flow behavior information based on information present within headers of data packets transmitted or received by the network device;
perform one or more inline heuristic operations on the flow behavior information to obtain aggregate statistical information, wherein the aggregate statistical information includes a summary of information across all flows;
perform one or more analytical operations on the flow behavior information to obtain network insights; and
filter and plot the flow behavior information, the aggregate statistical information, and the network insights, based on a user input.

12. The system of claim 11, wherein the flow behavior information is constructed by flow based packet sampling of the information present within the headers of the data packet.

13. The system of claim 11, wherein the flow behavior information is captured as counts or statistics of one or more parameters associated with the data packets.

14. The system of claim 11, wherein the flow behavior information is captured in form of window observation, for a predefined time period.

15. The system of claim 14, wherein the flow behavior information is used to construct of at least one of current window, inter window, and all window, wherein the current window provides information on flows observed in a window time, the inter window provides information for same flow across multiple windows, and the all window provides flow behavior across all windows.

16. The system of claim 11, wherein the flow behavior information is stored in an independent flow table running in a separate instance of Open vSwitch DataBase (OVSDB) management protocol.

17. The system of claim 11, wherein the one or more inline heuristic operations are performed using Open vSwitch DataBase (OVSDB) management protocol.

18. The system of claim 11, wherein the aggregate statistical information is integrated with an on switch Network Analytics Engine (NAE) for storing time series information of a network switch.

19. The system of claim 11, wherein the network insights obtained from the integrated analytics layer are used for making changes in configuration of the one or more network devices.

20. The system of claim 11, wherein the presentation layer allows plotting of the information based on one or more factors including flow (tuple), current window behavior, inter window heuristic, all window behavior, combined analytics prefix match, supervised tagging, and unsupervised cluster identity.

* * * * *